United States Patent [19]
Wachs

[11] Patent Number: 6,147,640
[45] Date of Patent: Nov. 14, 2000

[54] COMMUNICATIONS SATELLITE INTERFERENCE LOCATION SYSTEM

[75] Inventor: Marvin R. Wachs, Calabasas, Calif.

[73] Assignee: Hughes Electronics Corporation, El Segundo, Calif.

[21] Appl. No.: 09/270,160

[22] Filed: Mar. 16, 1999

[51] Int. Cl.[7] .............................. G01S 5/02; H04B 7/185
[52] U.S. Cl. .................. 342/354; 342/352; 342/357.01; 342/378; 342/450; 342/451
[58] Field of Search ................ 342/13–20, 159, 342/165, 173, 174, 175, 352–358, 385, 417, 422–424, 428–430, 432, 434, 437, 442, 443, 445, 450, 451, 378, 387, 393, 458, 465; 455/13.1

[56] References Cited

U.S. PATENT DOCUMENTS

| | | | |
|---|---|---|---|
| 4,170,776 | 10/1979 | MacDoran | 342/458 |
| 5,008,679 | 4/1991 | Effland et al. | 342/353 |
| 5,570,096 | 10/1996 | Knight et al. | 342/357 |
| 5,594,452 | 1/1997 | Webber et al. | 342/353 |
| 6,018,312 | 1/2000 | Haworth | 342/353 |

Primary Examiner—Bernarr E. Gregory
Attorney, Agent, or Firm—T. Gudmestad; M. W. Sales

[57] ABSTRACT

A system and method for determining the location of a source of interference for a communications satellite. The system has an antenna array located on the earth facing panel of the communications satellite. The method and system determine the direction of a source of interference relative to the satellite's own coordinate system. The angle of arrival of the interference signal is determined with respect to the horizontal and vertical baselines of the coordinate system and by comparing the outputs of the appropriate antennas in the antenna array.

13 Claims, 2 Drawing Sheets

COMMUNICATIONS SATELLITE INTERFERENCE LOCATION SYSTEM

TECHNICAL FIELD

The present invention relates to a method and system for locating a source of interference for a communications satellite. More particularly, the present invention relates to a method and system for locating a source of interference by comparing the phase outputs of an interferometer antenna system to determine an angle of arrival of an interfering signal.

BACKGROUND ART

Commercial communication satellites typically have receive antenna coverage patterns that encompass very large areas. Uplink interference signals, generated anywhere within the coverage area, can disrupt communication services. Sometimes, the cause of the interference can be determined merely by analyzing the modulation of the interference signal. However, in most cases, the only way to identify the source of the interference is to determine its physical location.

One method of locating the interference source is to physically move the satellite antenna and measure the effect on the interference signal. Knowing the satellite antenna pattern and its movement, the interference signal level variation allows an attempt at matching the signal behavior with a specific segment of the antenna pattern.

There are several disadvantages associated with this method. For example, physical movement of the satellite's antenna could potentially disrupt normal communications. Additionally, the interference source may be located at a portion of the antenna pattern where the signal level may not be sufficient, i.e. a flat portion of the antenna pattern. It is also possible that the behavior of the interference signal level may not be unique to a single portion of the pattern, making location virtually impossible.

Another location technique depends on the reception of the interference signal at two separated satellites as described in U.S. Pat. No. 5,008,679 to Effland et al. At least two satellite receivers receive an interfering signal from an unknown transmitter and retransmit the signals to a receiving station. The receiving station receives and processes the retransmitted interfering signals through cross-correlation to determine the location of the unknown transmitter.

Two separate co-located earth terminals receive the same interference signal from separate satellites. The time difference between the two signals is measured using some modulation characteristic of the interference as a time marker. If the locations of the satellites are known with a sufficient degree of accuracy, a line of position on the surface of the earth can be computed. A second, intersecting line of position can be generated using a third satellite in combination with one of the original two satellites. The accuracy of the position fix is dependent on the orientation of the satellite to satellite baselines for each measurement.

Obviously, a drawback to the approach mentioned above is that two satellites are required to determine a single line or position. A third satellite, preferably not in the same plane as the first two satellites, is required to determine a position fix. Another drawback is that the interference signal must be modulated with a waveform in order to provide an unambiguous time tag.

An addition to this technique, which is described in U.S. Pat. No. 5,570,096 to Knight et al., provides for the determination of the second line of position utilizing measurements of relative Doppler frequency shift on the signals received from the two satellites. This system significantly increases the complexity of the measurement and calculation. The approach still requires reception via at least two satellites and the interference must be modulated to permit time difference measurements.

SUMMARY OF THE INVENTION

The present invention requires only one satellite to locate an interference source. The present invention does not require any movement of the antenna pattern and it does not require that the interference signal be modulated. In the present invention, the direction of interference is directly determined in terms of orthogonal angles relative, to the spacecraft coordinate system.

The present invention is a method and system for determining the direction of a source of interference of a communications satellite relative to the satellite coordinate system. The angular location of the interference source is determined from the satellite using an interferometer antenna system having a plurality of receiving antennas positioned on the satellite to form two orthogonal baselines. The angle of arrival of the interfering signal is determined with respect to the baselines by comparing the phase of the outputs of the appropriate antennas.

The interferometer antenna system is a satellite borne antenna array having at least two elements on a physical baseline of the satellite coordinate system. The signals received by each element differ only in phase. The phase difference relates to the physical angle of arrival of the signals, relative to the baseline. When the relative phase is equal to a multiple of 180 degrees, the linear sum of the output signals approaches zero. A phase shifter, whose phase linearly increases with time, is introduced between one of the elements and the linear summing point. The output of the summer goes to zero each time that the total phase difference, between the summed input signals, equals an odd multiple of 180°.

The total phase shift consists of a time invariant component due to the angle of signal arrival and a time varying component due to the introduced phase shift. The time vs. phase relationship of the introduced phase shift is known and the time of the combined output null is measured, then through simple mathematical calculations, the direction of the interference signal can be determined.

It is an object of the present invention to locate the source of an interference signal using only one satellite. It is another object of the present invention to determine the source of interference in terms of orthogonal angles relative to the spacecraft coordinate system. It is yet another object of the present invention to eliminate the requirement for any movement of the satellite's antenna pattern and to eliminate the requirement for modulation of the interference signal.

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
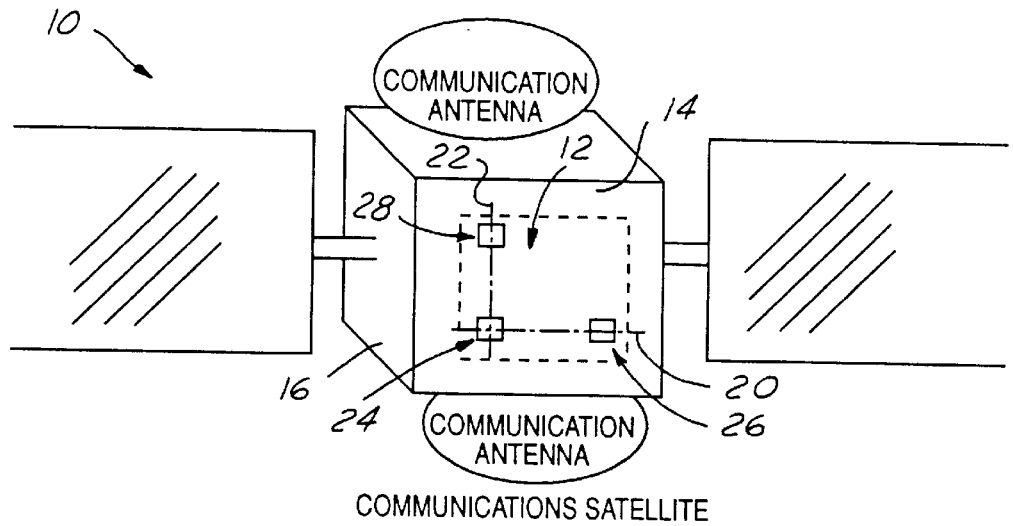
FIG. 1 is an illustration of the preferred embodiment of the system of the present invention on a communications satellite.

A satellite 10 having an interference location antenna array 12 used in the system of the present invention is shown in FIG. 1. The communications satellite has an earth-facing panel 14, on the satellite body 16 where the array 12 of the present invention is mounted. The antenna array 12 has at least two antenna elements on orthogonal baselines 20 and 22. The horizontal (or azimuth) baseline 20 has antenna elements 24 and 26 and the vertical (or elevational) baseline 22 has antenna elements 24 and 28.

In the preferred embodiment shown in FIG. 1, the array 12 has three wide beamwidth antennas 24, 26, and 28 arranged to form the orthogonal baselines 20 and 22. Each antenna 24, 26, and 28 is pointed in the same direction so as to have the same field of view. The antenna elements 24, 26 and 28 are mounted to the structure of the satellite 10 so that the array geometry has a known relation with respect to the satellite 10.

For discussion purposes, the system and method of the present invention will be described herein in terms of the horizontal baseline 20 using the pair of antenna elements 24 and 26. It should be noted that one of ordinary skill in the art is capable of translating the following discussion as it relates to the vertical baseline.

Figure 2:
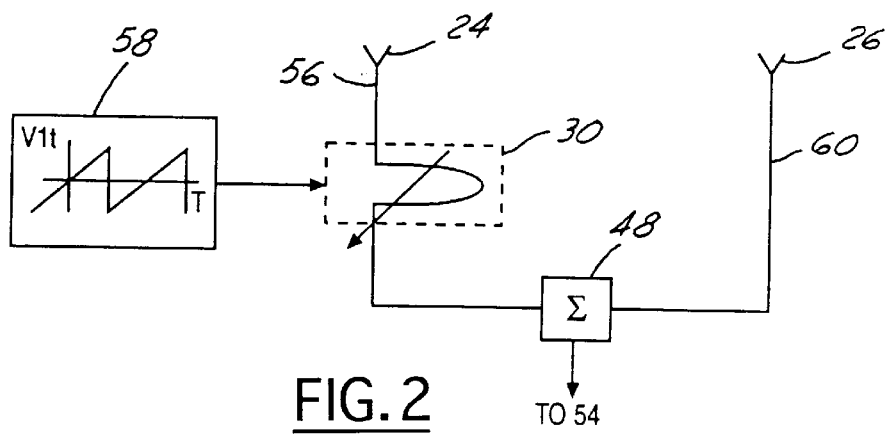
FIG. 2 is the system of the present invention shown in schematic.

FIG. 2 is a schematic representation of an embodiment of the system of the present invention. Output 56 of antenna element 24 is applied to an electronically swept phase shifter 30. The phase shifter 30 is connected to an input of a linear summer 48. The phase of the phase shifter 30 is linearly increasing at a constant rate, following a sawtooth waveform 58. Antenna element 26 is also connected to the linear summer 48 by line 60. The linear summer 48 combines the two inputs.

Figure 3:
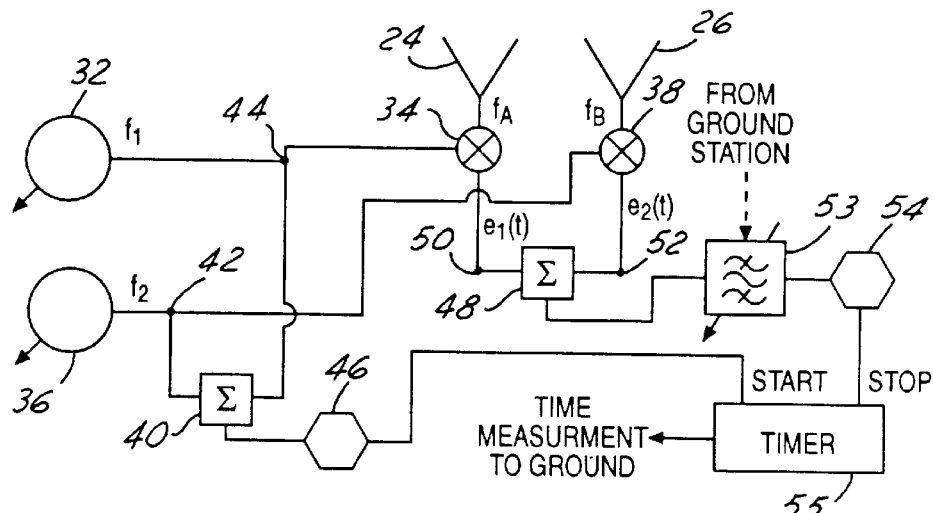
FIG. 3 is a schematic of one embodiment of a variable phase shifter that can be used in conjunction with the present invention.

As an alternative, FIG. 3 is a schematic representation of the preferred embodiment of the system of the present invention. A first local oscillator 32 is shown connected to a first mixer 34. A second local oscillator 36 is shown connected to a second mixer 38. A summer 40 is located at the outputs 42 and 44 of the local oscillators 36 and 32, respectively to linearly sum the outputs of the local oscillators 36 and 32 and provide a reference phase timing signal. The reference phase timing signal sum has periodic nulls. An envelope detector 46 detects the nulls in the linear sum of the oscillators 36 and 32.

A linearly increasing phase shift is introduced between antenna elements 24 and 26. A linear summer 48 is located at the outputs 50 and 52 of antennas 24 and 26 to provide the linear sum of the output signals. The frequency translated composite signal has periodic nulls of its own. The time of occurrence of the nulls of the composite signal is compared with the reference phase timing signal and the time difference between the null occurrences is used to determine the angle of arrival of the interfering signal as will be described in detail hereinafter.

Measuring the direction of an interfering signal using the method of the present invention requires knowledge of the frequency and bandwidth of the interference signal. This information can be obtained, for example, by observing the downlink signal from the satellite using a spectrum analyzer (not specifically shown) at a ground station (not specifically shown). Knowledge of the frequency and bandwidth of the interference signal allows the center frequency and bandwidth of a systems bandpass filter 53, shown in FIG. 3, to be set in order to optimize the signal to noise ratio.

A timer 55 measures the time difference between the nulls for the known reference phase signal and the nulls for the composite signal. In FIG. 3, the time measurement is shown as being transmitted to a ground station for analysis. It should be noted that the outputs of the summers may be transmitted to a timer at a ground station or the timer may be on the satellite.

There are several methods that can be used to introduce the phase shift between the antennas that is necessary for the system and method of the present invention. In FIG. 3, the phase shift is realized by frequency translating the outputs of the two antennas with two slightly different translation frequencies. Local oscillator 32 has a frequency, $f_1$, and local oscillator 36 has a frequency, $f_2$. The frequencies $f_1$ and $f_2$ are only slightly different. The relative phase change is determined by difference frequency. If the two equal amplitude translation frequencies are mixed together and low pass filtered, the resulting sinusoid can be used to indicate the relative phase of the phase shifter as follows:

$e_1(t) = \cos(f_0 - f_1)$ $e_2(t) = \cos(f_0 - f_2)t$, since $f_2 = f_1 + \Delta f$ $e_2(t) = \cos(f_0 - (f_1 + \Delta f))t$, and $e_2(t) = \cos((f_0 - f_1)t - \Delta f t)$, $\Delta f t$ is a linearly increasing phase.

When the phase shift is introduced as shown in either FIG. 2, FIG. 3, or any other suitable manner, the combined output of elements 24 and 26 will go through a null, or zero point, each time the total phase difference equals an odd multiple of 180 degrees. The null point of the reference phase signal is detected by the envelope detector and starts the timer. The detection of the null point of the composite signal stops the timer at the composite signal null. Knowing the time difference between nulls and the linear phase rate enables simple mathematical calculations to be performed to determine the angle of arrival of an interference signal and ultimately the source of the interference signal.

Figure 4:
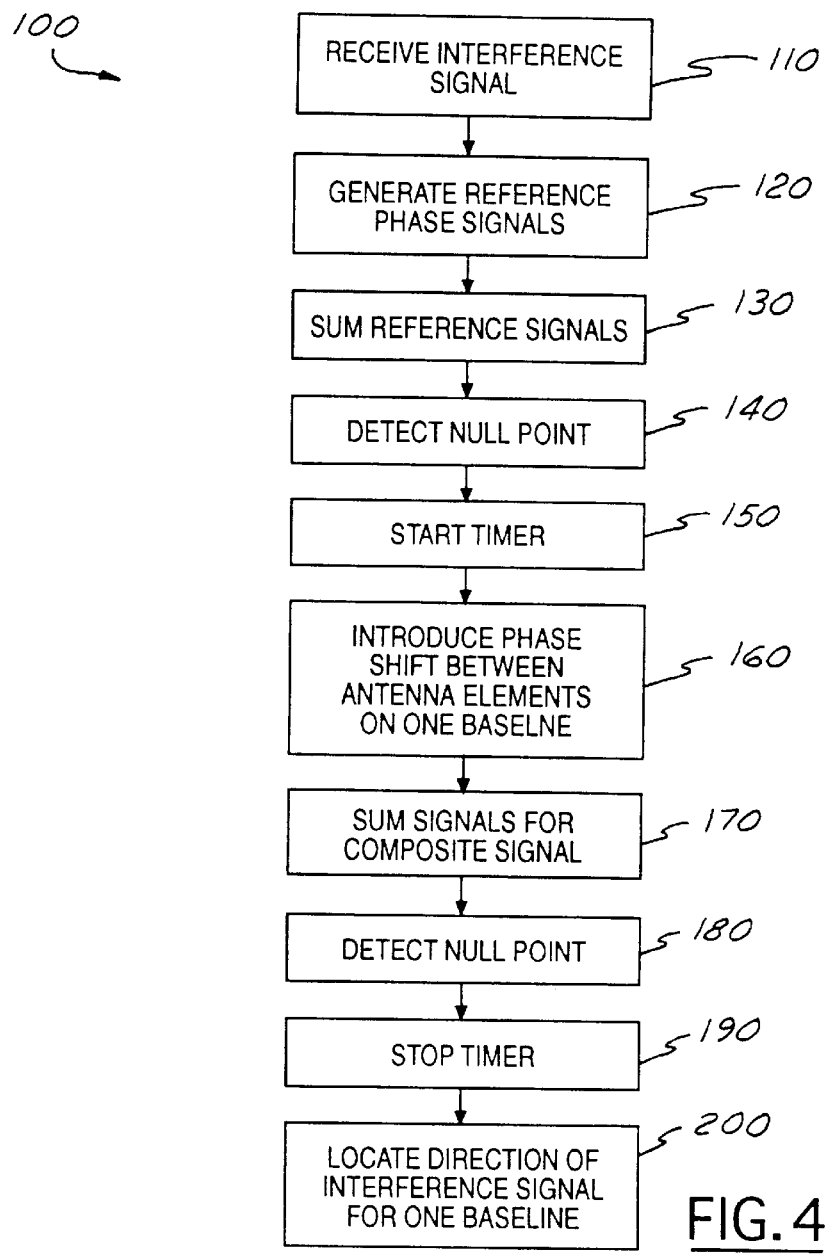
FIG. 4 is a flow chart illustrating the method for determining the location of an interference signal using the system of the present invention.

A flow chart summary of the method 100 of the present invention is shown in FIG. 4. As discussed above, the method will be described herein with reference to the horizontal baseline only. It is obvious to one of ordinary skill in the art that the method is applied in a similar manner to the vertical baseline to pinpoint a location for the interference signal.

An interference signal is received 110 at the antenna array and in particular, at the pair of antenna elements on the horizontal baseline.

A phase reference signal is generated 120 at the local oscillators. The outputs of the local oscillators are linearly summed 130. The sum will periodically achieve a null point. The phase reference nulls are detected 140 using an envelope detector or other suitable method. The timer begins timing 150 when the phase reference null is detected.

A linearly increasing phase shift is introduced 160 between a pair of the antenna elements. The shifted outputs of the pair of antenna elements are linearly summed 170 to achieve a composite signal. The linear sum of the composite signal also approaches zero when the component signals are at odd multiples of 180 degrees to each other. Using an envelope detector, or other suitable method, the composite signal nulls are detected 180. The timer stops timing 190 when the composite signal null is determined. The time between nulls of the reference phase is the measurement of the linear phase rate. The source of the interference signal can be determined 200.

Figure 5:
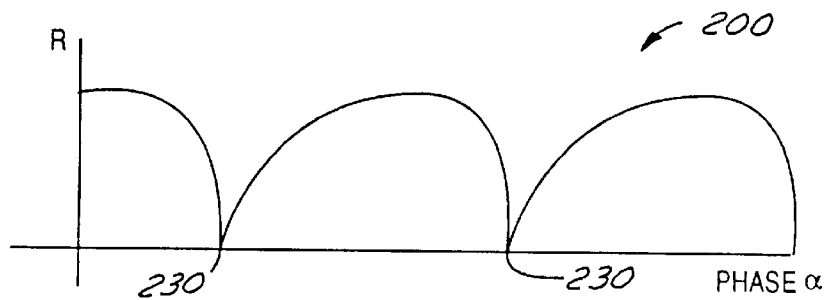
FIG. 5 is a graph of the phase vs. magnitude relationship of the composite signal.

The composite signal sum is a function of the signal level and the phase relationship between the two. The magnitude of the sum is given by:

$$R=(2V^2+2V^2 \cos \alpha)^{1/2}, \qquad (1)$$

where R is the magnitude of the sum, V is the magnitude of each signal, and $\alpha$ is the angle between the two signals. When $\alpha$ is an odd multiple of 180°, the magnitude, R, is zero as shown by the null points 230 on graph 220 in FIG. 5.

The angle $\alpha$ is determined by the spatial angle of arrival (AOA) of the interference signal and the electrical phase difference between the outputs of the two antenna elements to the summer. The component of angle $\alpha$ that results from the angle of arrival is given by:

$$\alpha_1 = 2 L_{80} \sin(AOA), \qquad (2)$$

where $\alpha_1$ is the spatial angle contribution to the angle $\alpha$. Angle AOA is the angle of arrival of the interference signal. $L_{80}$ is the length of the baseline in terms of wavelength. If the magnitude, V, of the signal were known, then measurement of the combined signal amplitude would allow determination of AOA. However, the magnitude, V, is unknown. A unique phase vs. amplitude relationship cannot be determined without varying the phase relationship.

As discussed above, when the phase relationship is varied, the magnitude of the composite signal sum will go to zero when the phases of the two component signals are 180 degrees apart. The time location of the null, or zero point, relative to the start of the phase reference depends on the angle of arrival (AOA). Thus, knowing the characteristics of the reference phase and the time difference between the leading edge of the reference phase and the composite signal zero point, the AOA can be determined.

In summary, R=0 when $\alpha$=180°. The angle, $\alpha$, is made up of a spatial angle component, $\alpha_1$, and an electrical phase component, for example, $\omega t$. The linear phase rate, $\omega$, and the time between the reference signal null and the composite signal null, t, are known. Therefore, it is possible to calculate the spatial angle component, ($\alpha_1$, and thereby determine the angle of arrival, AOA.

The same steps outlined above are taken with respect to antenna elements on the vertical baseline to determine the AOA. Having the AOA for both the horizontal and vertical baselines pinpoints the location of the interference signal.

The processing and analysis may be performed on the satellite by a computer included in the payload as an alternative to transmitting the information to a ground station for analysis.

As the baseline distance is increased, the angular resolution improves but the ambiguity increases. In some cases, depending upon the baseline length and the desired antenna's field of view, the resulting angle of arrival may not be unique. In other words, a given electrical phase angle may correspond to more than one angle of arrival. In such cases it becomes necessary to use additional antennas located along the same baseline at various distances. The use of comparison measurements from additional antennas reduces the ambiguity. This method for reducing ambiguity is well known in the art and will not be discussed in detail herein.

While particular embodiments of the invention have been shown and described, numerous variations and alternate embodiments will occur to those skilled in the art. Accordingly, it is intended that the invention be limited only in terms of the appended claims.

What is claimed is:

1. A system for determining the location of an interference signal received by a communications satellite, said communications satellite having an earth facing panel, said system comprising:

an antenna array having at least three antennas, said array located on said earth facing panel for receiving said interference signal, at least two antennas of said antenna array defining a horizontal baseline and at least two antennas of said antenna array defining a vertical baseline orthogonal to said horizontal baseline;

means for generating a reference signal whereby said reference signal has periodic null points;

means for detecting said periodic null points in said reference signal;

a timer connected to said means for detecting said periodic null points in said reference signal whereby said timer begins timing when said periodic null point in said reference signal is detected;

means for introducing a phase shift between said interference signal received at both of said at least two antennas on one of said baselines;

means for summing said shifted signals received at said at least two antennas defining a composite signal;

means for detecting a null point in said composite signal, said timer connected to said means for detecting a null point in said composite signal whereby said timer is stopped when said null point in said composite signal is detected, the amount of time between said null point in said reference signal and said null point in said composite signal defines a linear phase rate;

means for calculating an angle of arrival for said interference signal based on said reference signal and said linear phase rate.

2. The system as claimed in claim 1 wherein said means for generating a reference signal further comprises a first local oscillator having a first predetermined frequency;

a second local oscillator having a second predetermined frequency, said first and second predetermined frequencies being different from each other;

a summer for linearly summing said first and second predetermined frequencies to generate said reference signal.

3. The system as claimed in claim 2 wherein said first and second local oscillators generate said phase shift in said signal between said at least two antennas.

4. The system as claimed in claim 1 wherein said means for introducing said phase shift is a voltage controlled variable phase shifter.

5. The system as claimed in claim 1 wherein said means for detecting said periodic null points in said reference signal is an envelope detector.

6. The system as claimed in claim 1 wherein said means for detecting said periodic null points in said composite signal is an envelope detector.

7. The system as claimed in claim 1 wherein said means for summing said shifted signals is a summer.

8. The system as claimed in claim 1 wherein said means for calculating said angle o f arrival is located on said communications satellite.

9. The system as claimed in claim 1 wherein said means for calculating said angle of arrival is located at a ground station.

10. The system as claimed in claim 1 wherein a band pass filter is located between said composite signal and said timer for improving a signal to noise ratio.

11. The system as claimed in claim 1 further comprising:

means for introducing a phase shift between said interference signal received at both of said at least two antennas on the other of said baselines;

means for summing said shifted signals received at said at least two antennas defining a composite signal;

means for detecting a null point in said composite signal, said timer connected to said means for detecting a null point in said composite signal whereby said timer is stopped when said null point in said composite signal is detected, the amount of time between said null point in said reference signal and said null point in said composite signal defines a linear phase rate;

means for calculating an angle of arrival for said interference signal on the other of said baselines based on said reference signal and said linear phase rate.

12. A method for determining the location of an interference signal received by a communications satellite, said communications satellite having an earth facing panel and an antenna array having at least three antennas, at least two of said at least three antennas defining a horizontal baseline and at least two of said at least three antennas defining a vertical baseline orthogonal to said horizontal baseline, said method comprising the steps of:

receiving an interference signal at said at least two antennas on one of said baselines;

generating a reference signal;

detecting a null point in said reference signal;

starting a timer when said null point in said reference signal is detected;

introducing a phase shift between said interference signal received at both of said at least two antenna elements on at least one of said baselines;

summing said shifted signals to define a composite signal;

detecting a null point in said composite signal;

stopping said timer when said null point in said composite signal is detected;

locating a direction of an interference signal for at least one of said baselines.

13. The method as claimed in claim 12 wherein said method further comprises the steps of:

introducing a phase shift between said interference signal received at both of said at least two antenna elements on the other of said baselines;

summing said shifted signals to define a composite signal;

detecting a null point in said composite signal;

stopping said timer when said null point in said composite signal is detected;

locating a direction of an interference signal for the other of said baselines.

* * * * *